(No Model.) 2 Sheets—Sheet 1.
G. M. SNODGRASS.
COMBINED STALK CUTTER AND CULTIVATOR.
No. 511,658. Patented Dec. 26, 1893.
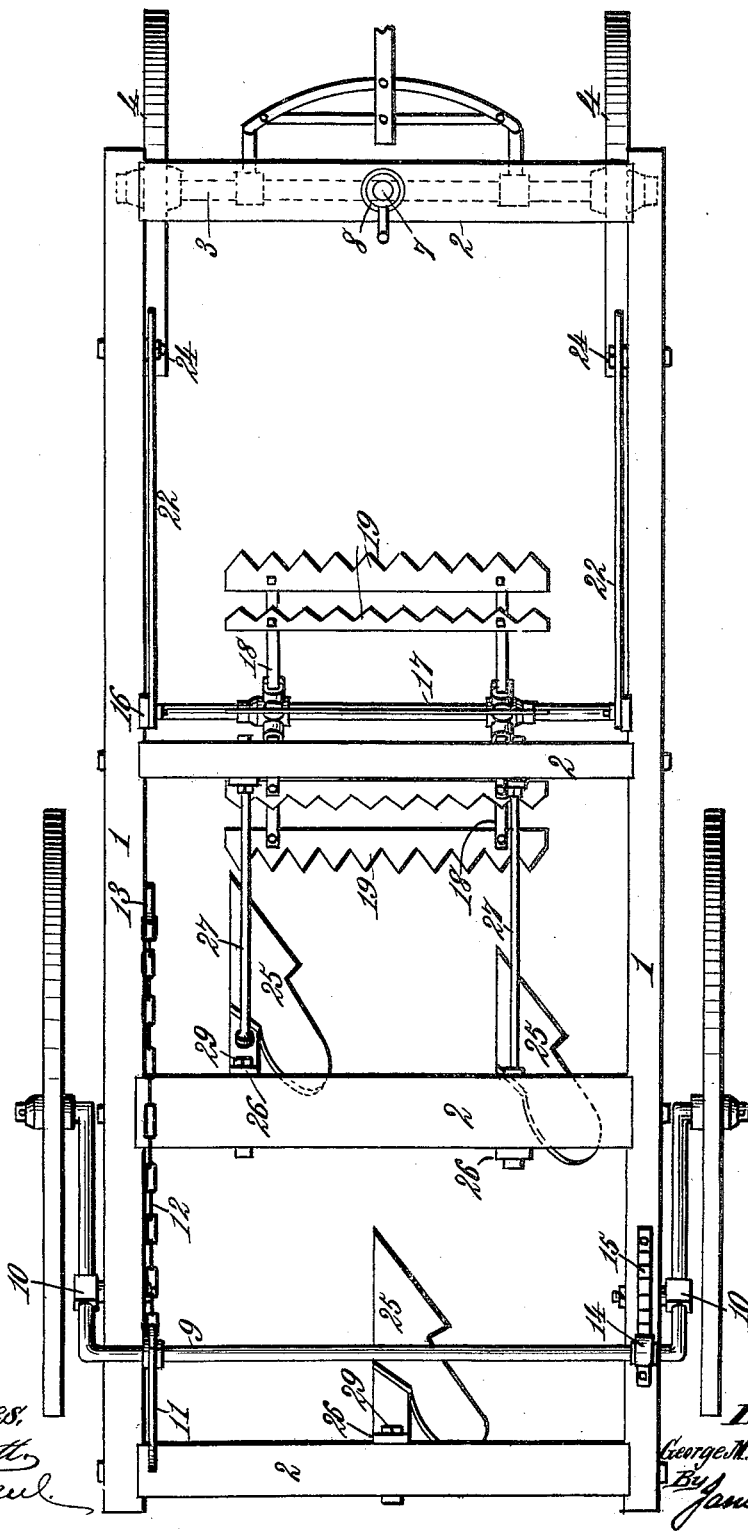

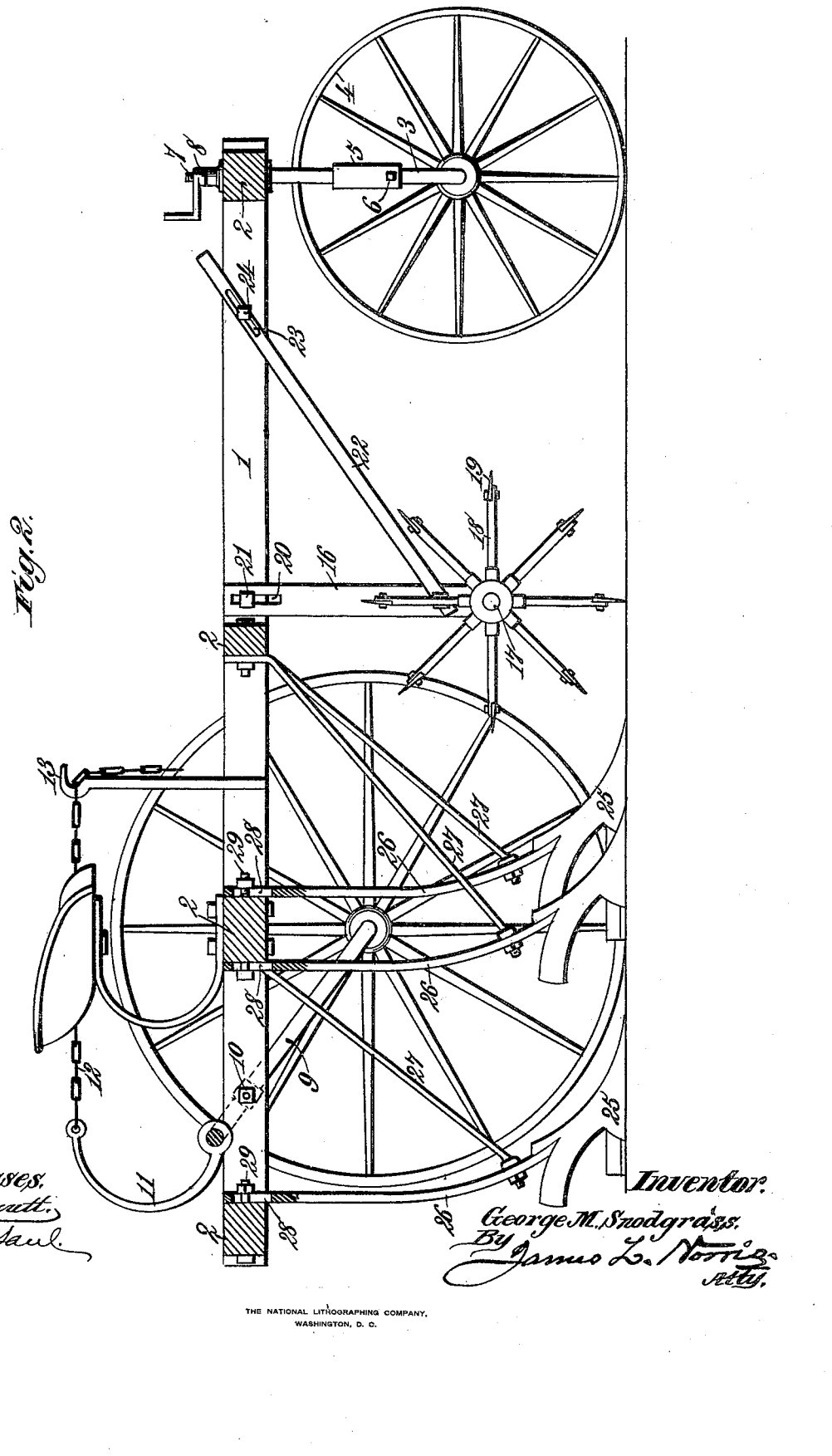

UNITED STATES PATENT OFFICE.

GEORGE MELVIN SNODGRASS, OF WACO, TEXAS, ASSIGNOR OF ONE-FOURTH TO VAN HALL, OF SAME PLACE.

COMBINED STALK-CUTTER AND CULTIVATOR.

SPECIFICATION forming part of Letters Patent No. 511,658, dated December 26, 1893.

Application filed September 7, 1893. Serial No. 485,004. (No model.)

*To all whom it may concern:*

Be it known that I, GEORGE MELVIN SNODGRASS, a citizen of the United States, residing at Waco, in the county of McLennan and State of Texas, have invented new and useful Improvements in a Combined Stalk-Cutter and Cultivator, of which the following is a specification.

This invention relates to a combined stalk cutter and cultivating machine comprising a rotary stalk cutter and a gang of plows and it consists in the features of construction and novel combination of devices in a machine adapted for various kinds of agricultural work as hereinafter more particularly described and claimed.

In the annexed drawings illustrating the invention—Figure 1 is a plan of a cultivating machine embodying my improvements. Fig. 2 is a sectional side elevation of the same.

Referring to the drawings, the numeral 1 designates the side rails of the machine frame and 2 the connecting cross-bars. The machine frame is preferably oblong and may be constructed wholly or in part of either wood or metal. At its forward end the machine frame is mounted on the top of an arched axle 3 to the spindles of which the forward wheels 4 are attached. The vertical arms of the forward arched axle 3 are each preferably formed in two sections connected by a thimble or socket-joint 5 provided with a set bolt 6 that will permit vertical adjustment of either arm of the axle to raise or lower either of the forward wheels. The forward end of the frame may be connected with the arched axle 3 through a vertical screw shaft 7 provided with a hand nut 8 by which the forward end of the frame can be raised or lowered to give it any required adjustment. The rear portion of the machine frame is mounted on an arched axle 9 that is extended above and across the frame. In the side rails 1 of the frame are pivots 10 with which the vertical arms of the rear arched axle 9 are connected so that in swinging forward or back it will raise or lower the machine frame, as the case may be. A curved lever 11 secured to the horizontal portion of the arched axle 9 affords a means for swinging the axle forward or back to raise or lower the machine frame. To the upper end of this lever 11 is secured one end of a chain or flexible connection 12 that is extended forward and secured to a hooked standard 13 on the machine frame in such a manner as to hold the axle and frame in the required relative position to which they may have been adjusted. Any one of the links in the chain 12 may be readily slipped over the hooked upper end of the standard 13 and thus hold the axle 9 in its adjusted position. If desired a pawl lever 14 may be arranged on the rear arched axle 9 in position to engage a segmental rack 15 on the machine frame, to assist in holding the frame and prevent the axle from falling forward when the frame is adjusted to its highest point.

At a point in rear of the forward axle are arranged two hangers 16 in the lower ends of which is journaled an axle 17 provided with radial arms 18 having cutting blades 19 secured thereto and forming a rotary stalk cutter. The upper end of each hanger 16 is adjustably connected to the frame of the machine by means of a vertically elongated slot 20 and a bolt 21 to permit a vertical adjustment of the rotary stalk cutter and enable its blades 19 to penetrate the soil to any desired depth.

I prefer to construct the cutting blades 19 of steel and provide them with teeth similar to a saw, sharp on their side edges and points, so that they will accomplish the required work with less than one half the pressure usually necessary.

The stalk cutter having been adjusted downward with its cutting blades in position to be thrust into the ground any desired depth a forward movement of the machine will cause the blades to revolve with their axle in such a manner that the blades will be easily forced through the stalks and thus cut them to pieces.

Each of the vertically adjustable hangers 16 is provided with a forward and upward extended brace 22 that is adjustably connected with the frame of the machine by means of a slot 23 and bolt 24 so as to be capable of adjustment with the stalk cutter.

At the rear of the rotary stalk cutter is arranged a gang of turning plows 25 carried by standards 26 each of which is provided with a forward and upward extended brace 27, and the upper ends of the several standards and braces are each formed with a vertically elongated slot 28 for passage of bolts 29 to permit a vertical adjustment of the plows so that they can be lowered to any required depth in the soil. By means of the stalk cutter and the gang of plows the stalks are cut to pieces and turned under at the same time that the ground is broken and prepared for another crop.

The vertical adjustment of the machine frame by means of the rear swinging arched axle 9 and lever 11 allows it to be easily and quickly elevated to raise the stalk cutter and gang plows from the ground. Or, by permitting the rear arched axle to swing backward the frame and attached devices will be lowered and allow the stalk cutter and the plows to be so adjusted as to enter the soil to any required depth.

The manner of mounting the forward end of the machine upon an arched axle wholly below the machine frame enables the machine to be easily turned short around, or in a small space.

It will be seen that the machine frame and the several cultivating devices are so constructed and connected that the stalk cutter and plows can be readily detached and replaced by other cultivating implements, if desired. With this machine a large area of land can be quickly prepared for planting and the several cultivating devices can be readily adjusted to the required positions for various kinds of work.

What I claim as my invention is—

1. In a cultivator machine, the combination of a main frame, a front supporting wheel therefor, a rear arched axle having its horizontal portion journaled to the main frame, ground wheels mounted on the ends of the arched axle, a lever secured to and rising from the arched axle for rocking the latter, means for holding the said lever in any desired position, a vertically adjustable rotary stalk cutter mounted on the main frame, and a gang of vertically adjustable blades mounted on said main frame in rear of the said stalk cutter, substantially as described.

2. In a cultivating machine, the combination of a main frame, a vertically adjustable front wheel therefor, a rear arched axle having its horizontal portion journaled to the main frame and provided at its ends with ground wheels, a lever secured to and rising from the axle for rocking the same, means for holding the lever in any desired position, a gang of vertically adjustable plows mounted on the main frame, and a vertically adjustable rotary stalk-cutter connected with the main frame and located between the gang of plows and the said vertically adjustable front supporting wheel, substantially as described.

3. A cultivating machine consisting of a vertically adjustable frame having a rear arched axle extended over and journaled upon the sides of the frame, wheels on the ends of the arched axle, a lever secured to and rising from said axle for throwing it forward or backward to raise or lower the frame, means for securing the frame in its adjusted position, a rotary stalk cutter, adjustable hangers for connecting the stalk cutter with the frame, and a gang of plows adjustably connected to the frame of the machine in rear of the stalk cutter, substantially as described.

In testimony whereof I have hereunto set my hand in presence of two subscribing witnesses.

GEORGE MELVIN SNODGRASS.

Witnesses:
ORLANDO WHEAT,
S. P. BARNARD.